(12) United States Patent
Haque

(10) Patent No.: US 6,663,930 B1
(45) Date of Patent: Dec. 16, 2003

(54) CHEMICAL RESISTANT ADHESIVE COMPOSITION

(75) Inventor: Shah A. Haque, Houston, TX (US)

(73) Assignee: Forty Ten L.L.C., Houston, TX (US)

( * ) Notice: Subject to any disclaimer, the term of this patent is extended or adjusted under 35 U.S.C. 154(b) by 0 days.

(21) Appl. No.: 09/245,694

(22) Filed: Feb. 6, 1999

(51) Int. Cl.[7] .............................. B32B 7/12; B32B 7/14
(52) U.S. Cl. .................. 428/35.7; 428/414; 428/506; 524/567; 525/113; 525/145; 528/98; 528/101; 528/103; 528/104; 528/111; 528/119; 528/365; 106/287.28; 156/330; 52/309.3; 52/417
(58) Field of Search ................... 428/35.7, 413, 428/414, 506; 524/567; 525/113, 145; 528/98, 101, 103, 104, 111, 119, 365; 106/287.28; 156/330; 52/309.3, 417

(56) References Cited

U.S. PATENT DOCUMENTS

| 4,106,971 A | 8/1978 | Briggs |
| 4,513,060 A | 4/1985 | Vasta |
| 4,542,202 A | * 9/1985 | Takeuchi et al. ............... 528/96 |
| 4,596,857 A | * 6/1986 | Doi et al. .................... 525/255 |
| 4,695,508 A | * 9/1987 | Kageyama et al. ......... 428/261 |
| 4,753,971 A | 6/1988 | Davis, Jr. et al. |
| 4,797,432 A | 1/1989 | Cavitt |
| 4,845,135 A | 7/1989 | Cavitt |
| 4,931,509 A | 6/1990 | Yagishita et al. |
| 5,208,290 A | * 5/1993 | Brugel ........................ 525/113 |
| 5,385,990 A | 1/1995 | Abbey et al. |
| 5,698,657 A | 12/1997 | Conner et al. |
| 5,756,829 A | 5/1998 | Meixner et al. |
| 5,814,693 A | * 9/1998 | Priest et al. ................. 524/188 |

FOREIGN PATENT DOCUMENTS

EP          0421 688 B1     10/1991

* cited by examiner

Primary Examiner—Harold Pyon
Assistant Examiner—Sow-Fun Hon
(74) Attorney, Agent, or Firm—John R Casperson

(57) ABSTRACT

Gel formation is prevented in the reaction between a sulfonyl-chloride-containing resin and a polyamine by first forming an adduct between the resin with an aminophenol. The prevention of gel formation enables sulfonyl-chloride containing resin to be used in admixture with acrylates and epoxy resin to form a polyamine-curable adhesive composition having excellent adhesive properties and chemical resistance.

7 Claims, 1 Drawing Sheet

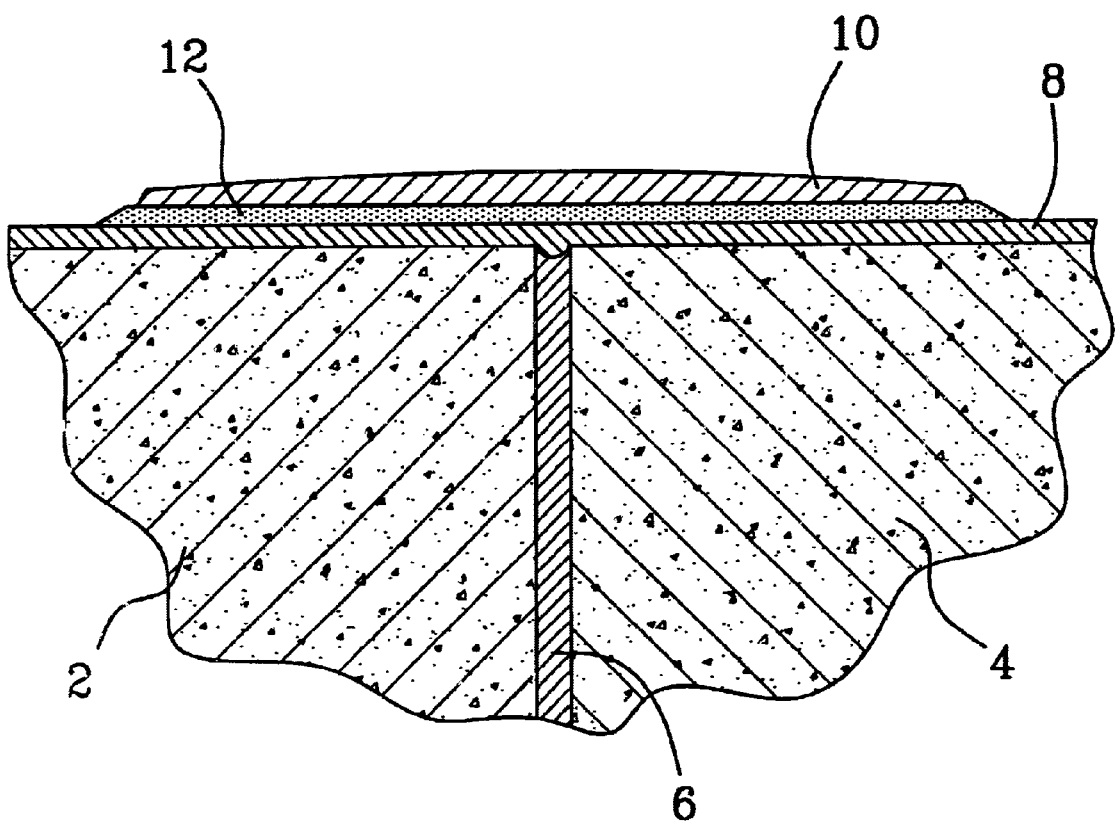
FIGURE

CHEMICAL RESISTANT ADHESIVE COMPOSITION

BACKGROUND OF THE INVENTION

In one aspect, this invention relates to controlling the rate of a cross-linking reaction which occurs during the curing of a chemical composition. In another aspect, this invention relates to an adhesive composition. In a further aspect, the invention relates to an adhesive composition which bonds to a chemically inert substance. In yet another aspect, this invention relates to bonding a chemically inert elastomeric tape to a substrate.

A wide variety of coatings for sumps, tank interiors, containment linings, flooring systems and joint overlays are known. However, such coatings tend to fail upon the failure or movement of the underlying substrate to which the coatings are bonded, generally by cracking, peeling or delaminating. The problem is worse where movement between adjacent substrates is likely, such as in a corner, or along an expansion joint or crack.

Coating integrity can be enhanced by adhering an elastomeric tape to the substrate along the just identified trouble areas, and then applying the coating over the tape.

However, chemically inert elastomeric tapes, which are able to resist degradation by acids, bases and solvents, are very difficult to reliably bond to many substrates. An adhesive which provides good bonding, has good flexibility and gap bridging properties between concrete, vinyl, epoxy and many other substrates would be very desirable.

An adhesive which retains these properties under conditions of low temperatures, where many adhesive materials become brittle, or high temperatures, where many adhesive materials loose strength, would also be very desirable.

Many adhesive systems are difficult to apply in the field. Extremes of field conditions, such as extremes of temperature or humidity, can make it further difficult to apply an adhesive so as to achieve a satisfactory bond. An adhesive which may be applied at a temperature as low as 5° C. and as high as 60° C. and over a wide range of humidities, without affecting its properties, would be very desirable.

A chemically resistant adhesive is needed in various industrial applications. The majority of current adhesive systems is adversely affected by strong acids, bases and solvents and is also susceptible to degradation by ozone, UV, and γ-rays. An adhesive system which is resistant to degradation by such agents, as well as to discoloration induced by these or other agents would also be very desirable.

SUMMARY OF THE INVENTION

In accordance with one embodiment of the invention there is provided a composition comprising an adhesive resin, a cross-linking regulator, and a hardener. The composition is usefully employed as an adhesive.

In accordance with a preferred embodiment of the invention, the adhesive resin comprises a reactive polyolefin, at least one acrylate monomer, and an epoxy resin. An adhesive resin formed from these constituents produces an adhesive composition is well adapted for adherence to a chemically inert elastomeric tape formed from similar substances.

In an even more preferred embodiment, the reactive polyolefin component comprises a halogenated and halosulfonated polyethylene which is combined with sufficient acrylate monomer to achieve solubility and sufficient cross-linking regulator to avoid gel formation when the hardener is added. The resulting adhesive composition has good initial tack and cures over a time period ranging from a few minutes to a few hours. The cured composition has outstanding resistance to aggressive chemicals and outstanding adhesion to both concrete and to an elastomeric tape formed from related materials. Also, it has been found that incorporating a minor amount of trichloroethylene into the adhesive composition provides even further improved adhesion to concrete.

BRIEF DESCRIPTION OF THE DRAWINGS

The FIGURE is a schematic, cross-sectional view of a concrete slab having an inert polyolefin tape adhered thereto over a joint with the adhesive of the invention.

DETAILED DESCRIPTION OF THE INVENTION

In accordance with one embodiment of the invention there is provided a composition comprising an adhesive resin (Part-A), a cross-linking regulator (Part-B), and a hardener (Part-C). The composition is usefully employed as an adhesive, and is especially useful for bonding inert polyolefin structures, for example joint tape, to substrates, for example, concrete.

The Adhesive Resin (Part-A)

Generally speaking, the resin comprises a reactive polyolefin, at least one acrylate monomer, and an epoxy resin. The resin also preferably includes a minor amount of trichloroethylene, which has been found to improve adhesion between inert polyolefin tape and concrete substrate.

The Reactive Polyolefin Component

The reactive polyolefin component preferably comprises a reactive halo- and halosulfonated polyolefin. More preferably, the polyolefin is chlorinated and chlorosulfonated. In the preferred embodiment, the chlorine content generally ranges from between about 20 wt % to about 50 wt %, and the sulfur content generally ranges from about 0.5 wt % to about 2.5 wt %, based on total weight of the reactive polyolefin component.

Generally speaking, the reactive polyolefin component can be represented by the formula

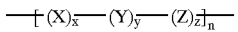

wherein X represents an alkyl group, Y represents a halide group, Z represents a halosulfonyl group, $x+y+z=1$, $0.2 \leq y \leq 0.5$, $0.005 \leq z \leq 0.05$, and $50 \leq n \leq 10,000$.

Usually, the reactive polyolefin component can be represented by the formula

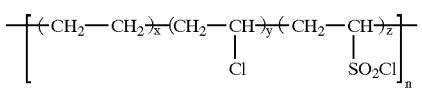

As determined by gel permeation chromatography, the molecular weight, $M_n$, generally ranges between about 1,000 and 250,000 and the molecular weight distribution, MWD, generally ranges from 1.5 to 6.5.

An exemplary material suitable for use in the invention is represented by the above formula (2) where y=0.43, z=0.011 and n≈1500.

The Acrylate Monomer(s)

Generally speaking, the acrylate component comprises an acrylate or methacrylate or both. The monomer(s) are preferably represented by the formula

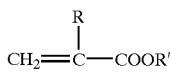

where R=H or $CH_3$, and R' is $C_1$–$C_{15}$, alkyl or alkenyl group, preferably a $C_1$–$C_8$ alkyl or alkenyl group. Preferably, a sufficient amount of the acrylate monomer is present to solubilize the reactive polyolefin component. The most preferred acrylate monomer comprises methyl methacrylate, because of high solubility, although other acrylates and/or methacrylates also work well.

The Epoxy Resin Component

The epoxy resin component is generally characterized as a polyepoxide. The epoxy content generally ranges from between about 1.7 and about 2.0 epoxy functions per chain. Usually, the epoxy resin comprises a diepoxide represented by the formula

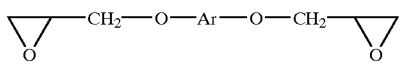

wherein Ar comprises an aryl group containing between about 12 and about 24 carbon atoms. An exemplary material comprises Bis-F epoxy resin which is Bis(4-glycidyloxyphenyl)methane represented by the formula:

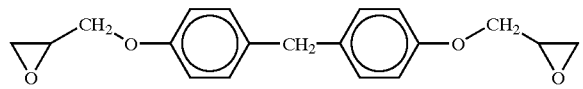

The Cross-linking Regulator (Part-B)

The cross-linking regulator, by itself, does not function as a polymerization catalyst, co-catalyst, accelerator, initiator, promotor, or free-radical generator. The regulator forms, near instantaneously, an adduct or complex, with the reactive polyolefin which can initiate polymerization of the acrylate and cross-linking of the acrylate with the reactive polyolefin. Most importantly, the cross-linking regulator prevents rapid gelling of the reactive olefin when the hardener is added. Generally speaking, the function of the cross-linking regulator can be described as that of moderating the reactive polyolefin component.

The cross-linking regulator generally comprises a polyamine, usually a polyaminophenol, and preferably a polyaminoalkylphenol. An exemplary class of cross-linking regulators can be represented by the formula

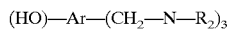

where R is alkyl having from one to 4 carbon atoms, preferably one carbon atom and Ar is an aryl group containing from 6 to 12 carbon atoms and is preferably phenyl.

A preferred regulator comprises 2,4,6-tris(dimethylarninomethyl)phenol, which can be represented by the following formula.

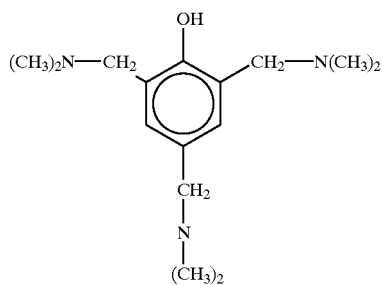

Amounts

The above described reactants for producing the adhesive composition of the invention described above are preferably combined in an admixture which is further preferably characterized by the essential absence of non-reactive solvent. The admixture generally contains in the range of from about 10 wt % to about 50 wt % of the reactive polyolefin, in the range of from about 10 wt % to about 50 wt % of the acrylate monomer, and in the range of from about 10 wt % to about 50 wt % of the epoxy resin, and lesser amounts of optional other ingredients as exemplified by the Examples herein.

Hardener or Curing Agent (Part-C)

Generally speaking, a sufficient amount of curing agent is added to cause the composition to become cured after a useful working life in the range of from about 3 to about 300 minutes, preferably after about a working life in the range of from about 10 to about 100 minutes. Preferably, the admixture of reactive polyolefin, at least one acrylate monomer and epoxy resin is first brought together with the cross-linking regulator to form a first reaction mixture and then the curing agents is brought together with the first reaction mixture to form a second reaction mixture.

Suitable curing agents are commercially available and can generally be described as containing at least two amine functionality. Exemplary curing agents can be represented by the formula

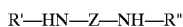

wherein R' and R" are independently selected from the group consisting of H and a $C_1$–$C_4$ alkyl group and Z is selected from the group consisting of a $C_1$–$C_{15}$ alkyl group and a $C_6$–$C_{10}$ aryl group. An exemplary curing agent is available from Shell Chemical Company under the trade name "Epicure 3251". It contains a Mannich base of the general formula (8)

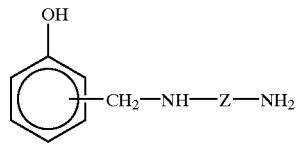

where Z is a $C_{1-C15}$ alkyl group.

Mechanism

The purpose aid role of the cross-linking regulator is to control the reaction of the adhesive resin (Part-A) comprising (i) chlorinated and chlorosulfonated polyolefin, (ii) acrylates and (iii) epoxy resin. The cross-linking regulator is not merely a "polymerization inhibitor".

For convenience, the moiety

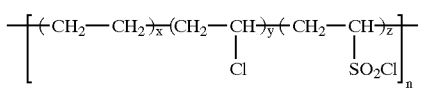   (2)

is represented by the formula

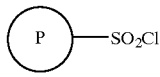   (9)

where (P) is polymer backbone.
Reaction Without Cross-linking Regulator
With no cross-linking regulator added, the reaction

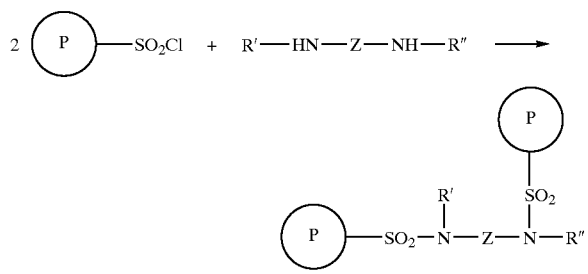

proceeds very quickly, forming a near instantaneous gel of cross-linked material. (P)—$SO_2Cl$ and $CH_2$=CHR—COOR' essentially do not react; there is no free-radical polymerization.
Cross-linking Regulator Added
The cross-linking regulator forms a near instantaneous complex with the resin component according to

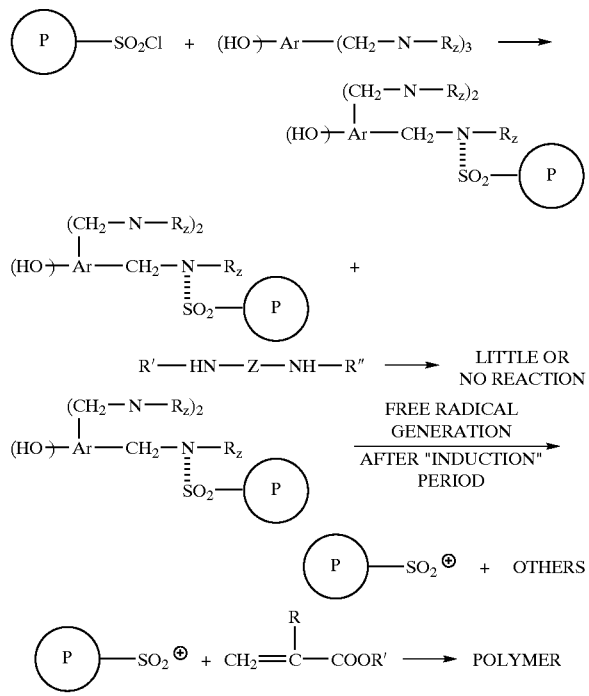

Thus, a purpose and role of the cross-linking regulator is to stop the very fast reaction of (P)—$SO_2Cl$ (the—$SO_2Cl$ group reaction) with the curing agent (the R'—HN— functional group) to prevent pregelling. Pregelling renders the product useless.

The cross-linking-regulator forms a complex with (P)—$SO_2Cl$ which is the free-radical source for the polymerization of acrylates (component (ii) of adhesive resin part-A). The cross-linking regulator does not act as inhibitor of polymerization. It provides sufficient "induction" period of polymerization to prevent pregelling and enough time to apply the material (ease of application).

The cross-linking regulator further increases the reactivity of otherwise slow curing Bis-F-epoxy resin (part (iii) of adhesive resin Part-A).

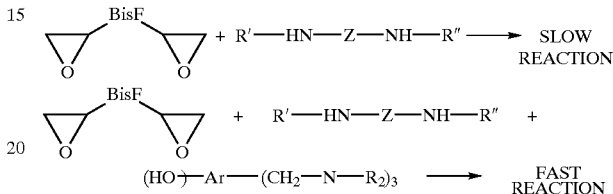

In another aspect, the invention thus provides a method for effecting a cure of a composition which contains a reactive halosulfonated polyolefin in a controlled manner. The method is carried out by combining a sufficient amount of a cross-linking regulator with the reactive halosulfonated polyolefin to hinder a self cross-linking reaction of the reactive halosulfonated polyolefin and form a stabilized composition. The stabilized composition is then cured by combining therewith an amount of a polyamine to initiate a cross-linking reaction in the reactive halosulfonated polyolefin containing the cross-linking regulator to effect a cure of said composition to a flexible, semi-solid stage. Preferably, the cure reaction occurs over a reaction period ranging from about 5 minutes to about 5 hours at a temperature in the range of from about 0° C. to about 50° C. and is sufficiently slow so that the temperature of the curing composition does not increase over about 5° C. under field conditions.

Description of the Drawing

The invention was developed with a view toward providing an improved a interior joint structure for a building, container or the like. With reference to the Figure, two substrates 2, 4 come together to define the joint section, such as a corner or, as shown, an expansion joint. In the illustrated embodiment, the expansion joint is filled with an elastomeric sealant 6. The substrates are usually concrete, often coated. In the illustrated embodiment, the concrete which carries a polymer coating 8. A chemically inert polyolefin tape 10 covers the joint section. An adhesive material 12 according to the invention secures the chemically inert polyolefin tape to the substrates to provide a strong bond between the substrates and the chemically inert polyolefin tape.

The chemically inert polyolefin tape 10 is preferably highly resistant to strong acids and bases and is flexible and tear-resistant so as to resist loss of fluid tight integrity in the event of relative movement between the two substrates which define the joint section. A highly suitable tape for use in accordance with the invention is formed from chlorosulfonated polyethylene which has been cross-linked and has a thickness in the range of from about 0.1 to about 10 millimeters. A preferred tape is one which has been cross-linked with an aminoalkoxysilane and has a thickness in the range of from about 0.3 to about 3 millimeters, with a mid-section of the tape having a greater thickness than edge sections of the tape. An exemplary tape formed from this material is resistant to strong organic and inorganic acids, e.g., glacial acetic acid, 98% $H_2SO_4$, 70% $HNO_3$, and 85% $H_3PO_4$.

In the method of the invention, a coating of adhesive composition in accordance with the invention is applied on a surface of a substrate alongside a discontinuity. A flexible tape, such as that just described, is positioned on the coating and in sealing relationship with the discontinuity. The coating is then permitted to cure thereby adhering the adhesive composition the substrate and to the tape to seal the discontinuity. The surface of the tape is preferably roughened prior to positioning.

The invention is further illustrated by the following examples.

EXAMPLE I

Adhesive Resin (Part-A)

The ingredients used in an exemplary adhesive resin, (Part-A), are tabulated below

TABLE I

| Composition | wt % | Functionality (moles/100 gm) | |
|---|---|---|---|
| Hypalon H-30 | 26.49 | 3.4 ($10^{-2}$) | —$SO_2Cl$ group |
| MMA | 27.68 | 0.277 | double bond |
| 2-EHA | 5.54 | 0.03 | double bond |
| MTBHQ | 0.03 | — | — |
| 1,6-HDODA | 2.21 | 0.02 | double bond |
| TCE | 4.84 | 0.037 | double bond |
| EPON 862 | 33.21 | 0.195 | double bond |

In the table above, Hypalon H-30 is a reactive polyethylene containing 43 wt % chlorine and 1.1 wt % sulfur from Dupont. MMA is methyl methacrylate. 2-EHA is 2-ethylhexylacrylate. MTBHQ is mono-t-butyl hydroquinone, a polymerization inhibitor. 1,6-HDODA is 1,6-hexanediol diacrylate. TCE is trichloroethylene. EPON 862 is Bis-F epoxy resin from Shell Chemical Co.

The Part-A adhesive resin was prepared by the following procedure:

221.8 gm of MMA was taken in a metal can, placed over a cold water bath (10 –15° C.), fitted with a mechanical stirrer. Then 150 gm Hypalon H-30 and 0.27 gm MTBHQ were added. The mixture was stirred for 8 hours to dissolve most of the Hypalon H-30. The temperature of the solution was controlled below 90° F. either by adding ice in the water bath or by cold water circulation. Then the remaining Hypalon H-30 (715 gm) and 2-EHA (44.3 gin) were added and the mixture was stirred moderately while maintaining the temperature at or below 90° F., until all Hypalon H-30 dissolved completely (about 8 hours). Then, the 1,6-HDODA, TCE and EPON 862 were added respectively, and the resulting admixture was stirred for another 30 minutes to ensure complete dispersion of the ingredients.

Cross-linking Regulator, (Part-B)

The cross-linking regulator employed was 2,4,6-tris(dimethylaminomethyl)phenol from a commercial source.

Hardener, (Part-C)

The hardener employed was a Mannich base obtained from Shell Chemical Company commercially known as Epicure 3251.

Preparation of Adhesive Composition

An adhesive composition was prepared by stirring 100 gm of the adhesive resin (Part-A) with 6 gm of the cross-linking regulator (Part-B) for 2–3 minutes. Then, 25 gm of hardener (Part-C) was added and mixed thoroughly for 2–3 minutes. The resulting adhesive composition was then applied to the substrate.

The following properties were observed for the composition.

(1) Quality Control—As a quality control (QC) check, 4 gm of the adhesive resin and 5 gm of methyl ethyl ketone (MEK) were mixed to give a clear solution. To this solution, 5 gm of acetone was added, which gave a milky solution. No precipitation occurred. Precipitation would have been an indicator of material failure.

(2) Viscosity—Brookfield viscosity of the adhesive resin was in the range of 10,000 to 11,000 cps (at 77° F., HB#4).

(3) Gel time—A composition of Part-A/Part-B/Part-C in the ratio of 10/0.6/2.5 by weight showed a gel time of 80 minutes. The set time was observed to be about 4 hours. The test was carried at a laboratory temperature of 70° F. and 83% relative humidity.

The same test done at 110° F. and 65% relative humidity showed gel time of 30 minutes and set time of 100 minutes.

(4) Hang on vertical wall—The composition as in (3) above had a hang on a vertical wall of 20 mil thick at 70° F. at 83% relative humidity and 18 mil thick 110° F. at 65% relative humidity.

(5) Lap shear test A—The composition as in (3) above was applied on steel coupons. Steel-to-steel lap shear was determined as per ASTM D1002-94. The material was cured for one week at 40° F. and at 155° F., respectively. The lap shear, measured at room temperature, was 2,400 psi (lbs/sq.in) for the 40° F. cure and 3,150 psi for the 155° F. cure.

(6) Lap shear test B: The composition as in (3) above was applied on steel-elastomer tape-steel. The elastomer tape (polyethylene based chemically inert tape) was 1"×1" size, and the thickness was about 80 mil. The material was cured at 40° F. for one week. The lap shear, measured at room temperature, was 790 psi. Further post cure of the material at 155° F. overnight increased the lap shear strength to 927 psi.

(7) Acid Resistance Tests—the adhesive composition as in (3) above was applied on two surfaces for acid resistance tests.

(a) Chlorinated polyester coated concrete for $HNO_3$ immersion test—The adhesive was applied on the concrete surface to a thickness of approximately 20 mil, and then immediately 2"×2" EL-tape (Elasti-Liner joint tape) was put over the adhesive. The adhesive was cured at 65° F. for 16 hr and then at 140° F. for 8 hr.

The tape was immersed in 70% $HNO_3$ for 3 days. Then the acid was drained out and the area was washed with water 4–5 times. No adhesive failure was observed. The tape remained strongly adhered to the coated concrete, even after 3 days of strong acid immersion. The adhesive was not eaten up underneath by strong acid. Qualitative peel test revealed tape tear off rather than adhesion failure.

(b) Epoxy coated concrete for $H_2SO_4$ immersion test—Epoxy coated concrete was necessary to protect it against 98% $H_2SO_4$. The adhesive test was conducted as in 7(a) using 98% $H_2SO_4$ instead of nitric acid. In this case also, the adhesive did not fail. The tape remained strongly adhered to concrete. The acid formed an ablative layer on the adhesive edge. The Peel test revealed tape tear off, but not adhesion failure.

EXAMPLE IV

Variation of Adhesive Resin—An adhesive resin was prepared as shown in the following table:

TABLE V

| Composition | Amount (gm) | wt % |
|---|---|---|
| Hypalon H-30 | 26.49 | 39.66 |
| MMA | 27.68 | 41.44 |
| 2-EHA | 5.54 | 8.30 |
| MTBHQ | 0.03 | 0.04 |
| 1,6-HDODA | 2.21 | 3.31 |
| TCE | 4.84 | 7.25 |

The composition of the adhesive resin is the same as in Example I except that the epoxy resin (EPON 862) was not added.

(a) To 10 gm of the above resin, 0.6 gm of 2,4,6-(dimethylaminomethyl)phenol was added, stirred 2 minutes, and then Epicure 3251 was added while continuing stirring for another 2 minutes. The adhesive composition was applied on concrete substrate (approx. 20 mil) and EL-joint tape was placed over it. The adhesive composition did not cure properly in 24 hr, and the tape was easily peeled off by hand.

(b) To 10 gm of the above adhesive resin, 0.03 gm cobalt-naphthoate was added. To this resin mixture, 0.3 gm cumene hydroperoxide and 0.1 gm N,N-dimethylaniline were added while stirring for 3 minutes. The resulting composition was applied on concrete (approx. 15 mil) and EL-tape was placed over. The curing reaction was highly exothermic. The EL-joint tape swelled badly, and the edge of the tape curled upward and did not remain flat.

EXAMPLE V

Elastoline Joint Tape (EL joint tape)—This is a polyolefin based elastomeric tape which is highly resistant to 98% $H_2SO_4$, 70% $HNO_3$, glacial acetic acid, strong organic and inorganic bases, as well as some organic solvents. A typical tape has the following composition:

TABLE V

| Composition | wt % |
|---|---|
| Chlorosulfonated polyethylene | 65.6 |
| Carbon black | 1.7 |
| Titanium dioxide, white | 0.2 |
| Clay (amine modified) | 16.4 |
| Epoxy resin | 7.8 |
| Processing oil | 4.6 |
| Sulfur | 0.65 |
| Mixture of curing agents | 2.9 |

The materials were mill mixed, extruded to a 6" wide tape and cured at 325° F. for 30 minutes. The cured tape is flexible (300–500% elongation), high tensile (3000–4000 psi tensile strength), good tear (200–300 lb/inch Die C tear) and unaffected by strong acids and bases. Because of its strong chemical resistance, it does not adhere to any substrate using conventional adhesives. However, as shown above, adhesion is excellent when the inventive adhesive is used.

While certain preferred embodiments of the invention have been described herein, the invention is not to be construed as being so limited, except to the extent that such limitations are found in the claims.

What is claimed is:

1. A joint structure comprising two substrates which come together in a joint section;

a chemically inert polyolefin tape means for covering the joint section; and an adhesive material means for securing the chemically inert polyolefin tape to the substrates;

wherein the adhesive material comprises a complex reaction product between from about 10 wt % to about 50 wt % of a reactive polyolefin component, from about 10 wt % to about 50 wt % of at least one acrylate monomer component, said acrylate monomer component being present in an amount sufficient to solubilize the reactive polyolefin component and form a solution, and from about 10 wt % to about 50 wt % of a polyepoxide-containing epoxy resin component, with an aminophenol derivative, followed by a cross-linking reaction produced with a polyamine curative, in the absence of non-reactive solvent, to provide strong bonding between the substrates and the chemically inert polyolefin tape, wherein the reactive polyolefin component comprises polyethylene which has been both chlorinated and chlorosulfonated.

2. An interior joint structure as in claim 1 wherein the tape is highly resistant to strong acids and bases and is flexible and tear-resistant so as to resist loss of fluid tight integrity in the event of relative movement between the two substrates which define the joint section.

3. An interior joint structure as in claim 2 wherein the tape is formed from chlorosulfonated polyethylene which has been cross-linked and has a thickness in the range of from about 0.1 to about 10 millimeters.

4. An interior joint structure as in claim 3 wherein the chiorosulfonated polyethylene has been cross-linked with an aminoalkoxysilane.

5. An interior joint structure as in claim 3 wherein a mid-section of the tape has a greater thickness than edge sections of the tape.

6. A joint structure as in claim 1 wherein each of the two substrates comprises a concrete slab.

7. A joint structure as in claim 1 wherein each of the two substrates comprises a polymer coated concrete slab.

* * * * *